(12) United States Patent
Sears (10) Patent No.: US 8,200,723 B1
(45) Date of Patent: Jun. 12, 2012

(54) METADATA FILE SYSTEM BACKED BY DATABASE

(75) Inventor: Steven J. Sears, Westford, MA (US)

(73) Assignee: Network Appliance, Inc., Sunnyvale, CA (US)

( * ) Notice: Subject to any disclaimer, the term of this patent is extended or adjusted under 35 U.S.C. 154(b) by 275 days.

(21) Appl. No.: 12/427,651

(22) Filed: Apr. 21, 2009

(51) Int. Cl.
*G06F 17/30* (2006.01)

(52) U.S. Cl. ........................................ 707/828; 707/831

(58) Field of Classification Search ................ 707/636, 707/713, 716, 724, 790, 792, 802, 821, 822, 707/823, 825, 826, 827, 828, 831, E17.01, 707/963, 972, 999.102, 999.103, 999.107, 707/999.205
See application file for complete search history.

(56) References Cited

U.S. PATENT DOCUMENTS

| | | | | |
|---|---|---|---|---|
| 5,724,512 | A * | 3/1998 | Winterbottom | 709/226 |
| 5,933,637 | A * | 8/1999 | Hurley et al. | 717/107 |
| 7,461,098 | B2 * | 12/2008 | Fletcher et al. | 1/1 |
| 7,580,950 | B2 * | 8/2009 | Kavuri et al. | 1/1 |
| 7,587,426 | B2 * | 9/2009 | Fujiwara et al. | 1/1 |
| 7,873,619 | B1 * | 1/2011 | Faibish et al. | 707/705 |
| 8,015,343 | B2 | 9/2011 | Garman et al. | |
| 2005/0251495 | A1 * | 11/2005 | Woollen | 707/1 |
| 2006/0212746 | A1 * | 9/2006 | Amegadzie et al. | 714/6 |
| 2008/0172397 | A1 * | 7/2008 | Maeda et al. | 707/100 |
| 2009/0172049 | A1 * | 7/2009 | Hahn et al. | 707/205 |
| 2010/0257218 | A1 * | 10/2010 | Vassilev et al. | 707/823 |
| 2010/0287219 | A1 * | 11/2010 | Caso et al. | 707/827 |

OTHER PUBLICATIONS

Chuang, Shui-Ling, et al., "A Practical Web-Based Approach to Generating Topic Hierarchy for Text Segments", CIKM '04, Washington DC, Nov. 8-13, 2004, (2004), 127-136.

Network Appliance, Inc., Non-Final Office Action mailed Mar. 25, 2011 for U.S. Appl. No. 12/427,651., 22 pages.

Final Office Action mailed Oct. 28, 2011 for U.S. Appl. No. 12/427,659.

* cited by examiner

*Primary Examiner* — Robert Timblin
*Assistant Examiner* — Randall Burns
(74) *Attorney, Agent, or Firm* — Blakely, Sokoloff, Taylor & Zafman LLP (57) ABSTRACT

A system and a method for locating data in a physical storage volume using a unified file system, which includes a synthetic file system structure and a physical file system structure, is disclosed. Traversing the synthetic portion of the unified file system includes querying at least one user-mode database that defines the synthetic portion. The physical portion of the unified file system can be traversed to determine volume and connection information for the requested data.

25 Claims, 8 Drawing Sheets

METADATA FILE SYSTEM BACKED BY DATABASE

RELATED APPLICATION

The present application is related to currently pending U.S. patent application Ser. No. 12/427,659, filed on Apr. 21, 2009, entitled "SCALABLE CONNECTION METHOD FOR REMOTE FILE SYSTEMS."

FIELD OF INVENTION

The present invention relates to storage systems, and more particularly, to file systems.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright© 2009, NetApp, Inc., All rights Reserved.

BACKGROUND

A data storage system typically includes storage devices and one or more network storage servers or storage appliances. A storage server may provide services related to the organization of data on storage devices, such as disks. Some of these storage servers are commonly referred to as filers or file servers. The storage server may be implemented with a special-purpose computer or a general-purpose computer. Such storage systems typically use file systems to organize and provide easy access to the files they contain.

A synthetic file system presents a file system image to applications. Synthetic file systems are commonly used to represent processes, devices, and other system level abstractions that do not have storage requirements. By providing a file system image, these system level abstractions become much easier for applications to manipulate. Examples are the /proc file system present in various Unix and Unix-like systems, /devfs, the Plan9 IPC mechanism, and others.

Physical file systems are backed by disks or other persistent storage media. Physical file systems can also be backed by networks to persistent storage media in the case of Network File System (NFS), Andrew File System (AFS), and similar file systems. A physical storage volume can be made accessible in a physical file system by mounting the storage volume, in which case the operating system designates a directory in the physical file system where the files on the storage volume are to appear. Information about a network connection used to access the physical volume may also be managed by the physical file system.

However, when a large number of volumes are present, mounting such numerous volumes can become unwieldy every application is required to ask each volume server if it recognizes the file handle. Furthermore, system memory, processing time, and other resources are consumed when the system needs to maintain or manage a large number of network connections that are used to access the volumes. Also, the name space for referencing files on this large number of volumes may not be unified, so that not all of the volumes are accessible using a single name space. These factors may increase the amount of resources needed for providing applications with file information or data.

SUMMARY OF THE INVENTION

A unified file system enables applications to access all files and directories available on any volume in a cluster. The unified file system provides a global name space for all volumes in the cluster. All volumes appear under one mount. The unified file system includes a synthetic file system structure and a physical file system structure. A requested file stored on a physical storage volume is located by receiving a path to the requested file and traversing a synthetic portion and a physical portion of the unified file system according to the received path. Traversing the synthetic portion of the unified file system includes querying at least one user-mode database that defines the synthetic portion.

The present invention is described in conjunction with systems, clients, servers, methods, and computer-readable media of varying scope. In addition to the aspects of the present invention described in this summary, further aspects of the invention will become apparent by reference to the drawings and by reading the detailed description that follows.

BRIEF DESCRIPTION OF THE DRAWINGS

The present invention is illustrated by way of example and not limitation the figures of the accompanying drawings, in which like references indicate similar elements and in which.

DETAILED DESCRIPTION

In the following detailed description of embodiments of the invention, reference is made to the accompanying drawings in which like references indicate similar elements, and in which is shown by way of illustration specific embodiments in which the invention may be practiced. These embodiments are described in sufficient detail to enable those skilled in the art to practice the invention, and it is to be understood that other embodiments may be utilized and that logical, mechanical, electrical, functional, and other changes may be made without departing from the scope of the present invention. The following detailed description is, therefore, not to be taken in a limiting sense, and the scope of the present invention is defined only by the appended claims.

A hybrid file system, which includes a synthetic file system structure and a physical file system structure, can be used for locating data in a physical storage volume. A requested file stored on a physical storage volume is located by receiving a path to the requested file and traversing a synthetic portion and a physical portion of a hybrid file system according to the received path. Traversing the synthetic portion of the hybrid file system includes querying at least one user-mode database that defines the synthetic portion. The physical portion of the hybrid file system can be traversed according to the path to determine volume and connection information for the requested data.

A hybrid file system may be implemented in a storage network system that includes a number of physical storage volumes for serving data to a client. In such a storage network, some applications may benefit from executing on the storage platform, rather than on a client system. One example of such an application is antivirus software, which traverses directory structures to scan as many files as possible while searching for viruses. Such applications, which access files stored across a large number of volumes, can benefit from a file system structure that provides a unified name space covering the large number of volumes.

One way to provide such a unified name space is to unify the physical file systems corresponding to the physical storage volumes. A synthetic file system structure can be used to unify the physical file system structures of a large number of volumes, resulting in a hybrid file system that includes both a synthetic file system structure and a physical file system structure. Thus, when an application such as antivirus software requests a file, the hybrid file system can be used to determine the location of the file in the storage system.

Figure 1A:
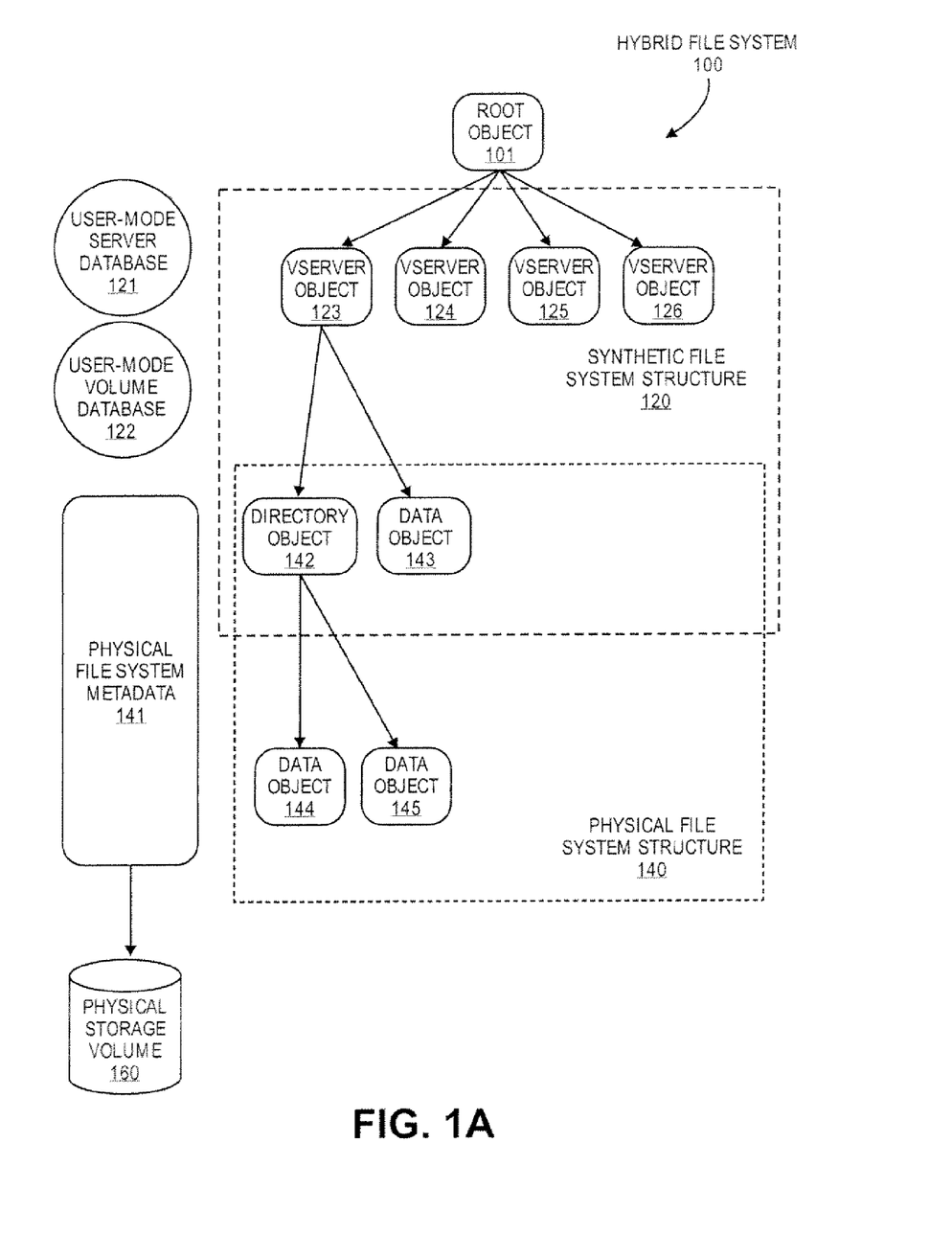
FIG. 1A is a block diagram illustrating one embodiment of a hybrid file system.

FIG. 1A illustrates a hybrid file system according to one embodiment. Hybrid file system 100 includes a synthetic file system structure 120 and a physical file system structure 140. Root object 101 provides an entry point for traversal of hybrid file system 100. Synthetic file system structure 120 includes vserver objects 123, 124, 125, and 326, directory object 142, and data object 143. Synthetic file system structure 120 is backed by user-mode databases 121 and 122. Physical file system structure 140 jointly includes directory object 142 and data object 143, and additionally includes data objects 144 and 145. Physical file system structure 140 is backed by physical storage volume 160. Physical file system metadata 141 describes physical storage volume 160.

In one embodiment, the hybrid file system 100 is capable of presenting a number of physical storage volumes from a remote storage system at a single mount point. The hybrid file system 100 provides a unified name space for these volumes, which can be accessed through the hybrid file system 100 using Portable Operating System Interface (POSIX) syntax.

In the embodiment shown in FIG. 1A, The hybrid file system 100 includes synthetic file system structure 120. Synthetic file system structure 120 includes a number of objects, or nodes. Each object is a data structure that defines a volume or volume collection, often called a vserver. A vserver contains common file system objects such as directories, data files, or other components in the file system structure. For example, vserver objects 123, 124, 125, and 126 each define directories that can be used to organize other objects.

Vserver objects in the synthetic file system 120 contain connection information allowing them to contact local or remote file systems. Directory and data objects such as 142 and 143 are created and maintained by a physical file system. In the synthetic file system, 142 and 143 are examples of transition objects, so called because these data structures contain information linking the synthetic file system to the physical file system.

Synthetic file system structure 120 unifies these objects in a single hierarchical structure. For example, root object 101 directly or indirectly references all of the objects in the file system, including vserver object 123. Vserver object 123 references directory object 142 and data object 143. Thus, the first level of the hierarchical arrangement includes root object 101, the second level includes vserver objects 123, 124, 125, and 126, and the third level includes directory object 142 and data object 143. References, such as links, pointers, or other identifiers are used to designate the hierarchical relationships between objects. In one embodiment, vserver object 123 references data object 143 by including a pointer to object 143. Data object 143 further includes a reciprocal pointer to vserver object 123. The system uses these pointers for traversing the hierarchy of the synthetic file system structure 120.

The synthetic file system structure 120 is backed by one or more user mode databases, such as user-mode databases 121 and 122. The metadata defining the objects and the hierarchy structure are stored within user-mode databases 121 and 122.

In one embodiment, the synthetic file system structure 120 is backed by a single user-mode database. Alternatively, the synthetic file system 120 is backed by two or more databases. FIG. 1A illustrates a synthetic file system structure 120 that is backed by two user-mode databases, 121 and 122. In one embodiment, database 121 contains a list of vservers located on various remote or local physical file systems, and database 122 contains connection and security information regarding individual vservers. Together they provide metadata allowing the synthetic file system 120 to access the vservers.

Figure 1B:
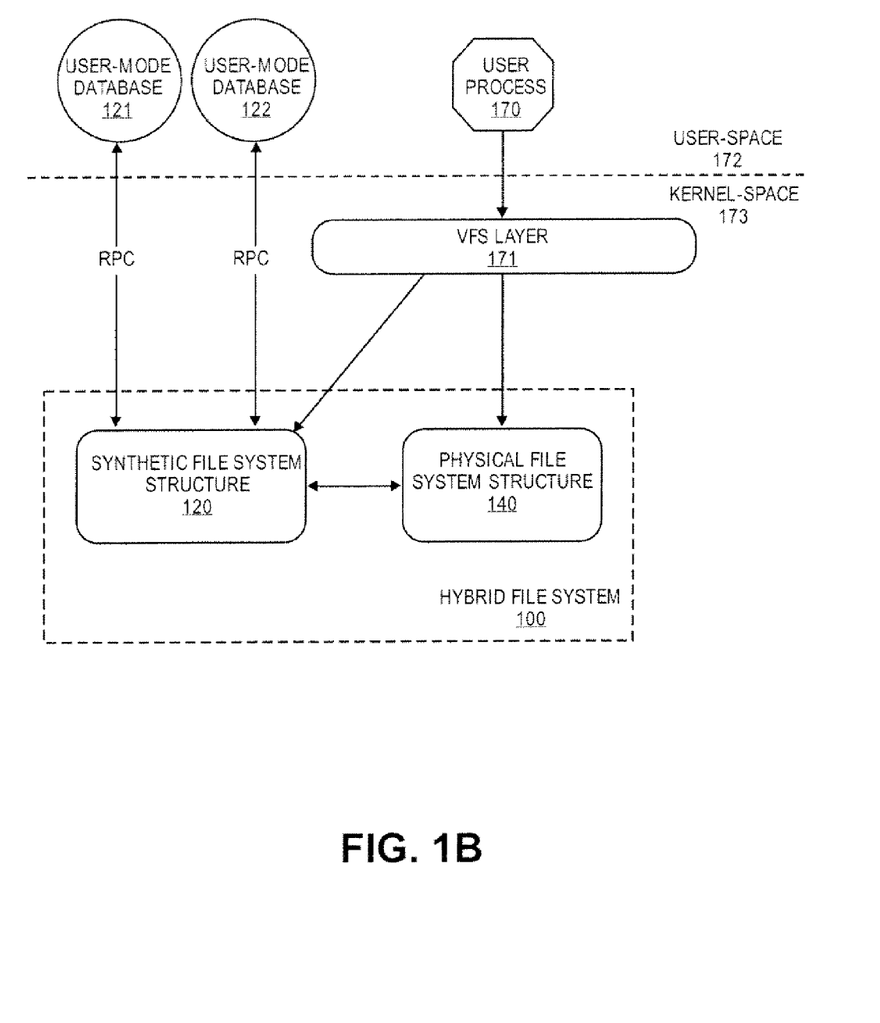
FIG. 1B is a block diagram illustrating operational relationships between a hybrid file system and other processes, according to one embodiment.

FIG. 1B illustrates the operational relationships of file system structures 120 and 140 with a virtual file system (VFS) layer 171, user-mode databases 121, 122, and a user process 170 that is using the hybrid file system 100 to locate a data file. User process 170 may be, for example, an antivirus application. VFS layer 171 is an abstraction layer that allows applications, such as user process 170, to access hybrid file system 100 in a uniform way. FIG. 1B further illustrates which components operate within user-space 172 and kernel-space 173.

VFS layer 171 and hybrid file system 100, which includes synthetic file system structure 120 and physical file system structure 140, both operate in kernel context 173. Thus, hybrid file system 100 and VFS layer 171 are kernel-mode processes. Processes operating in kernel mode are assumed to be trusted software, and can access system resources, such as memory, without restriction.

In contrast to kernel mode processes, user-mode applications operating in user-space 172 have restricted access to system resources, and must invoke system calls to access these resources. User-mode databases 121, 122, and user process 170 operate in user space.

The synthetic file system structure 120 is linked to the physical file system structure 140 through transition nodes. Transition nodes reside in the physical file system structure 120 and reference objects in the synthetic file system structure 140. Referring back to FIG. 1A, directory object 142 is a transition node because it resides in physical file system structure 140 and references parent vserver object 123, which reside in synthetic file system structure 120.

Physical file system structure 140 includes a hierarchical arrangement of objects. Like the objects in synthetic file system structure 120, the objects in physical file system structure 140 define file system components such as volumes, directories, and data files.

Physical file system structure 140 also similarly organizes objects into a hierarchical arrangement. The hierarchy of physical file system structure 140 includes directory object 142 and data objects 143, 144, and 145 of FIG. 1A. Directory object 142 includes references to data objects 144 and 145. Data objects 144 and 145 each include a reciprocal reference (not shown) back to directory object 142. The system can use these pointers to traverse the hierarchy of the physical file system structure 140.

In contrast with the synthetic file system structure 120, physical file system structure 140 is backed by disks, other types of persistent storage, or networks to persistent storage. Thus, the objects within the physical file system structure 140 may be defined by physical file system metadata 141, which describes the data stored on physical storage volume 160. Physical storage volume 160 may represent a physical disk or other persistent storage media. In one embodiment, physical storage volume 160 is directly connected to the platform on which hybrid file system 100 operates. Alternatively, physical storage volume 160 is accessible to hybrid file system 100 through a network connection.

Figure 1C:
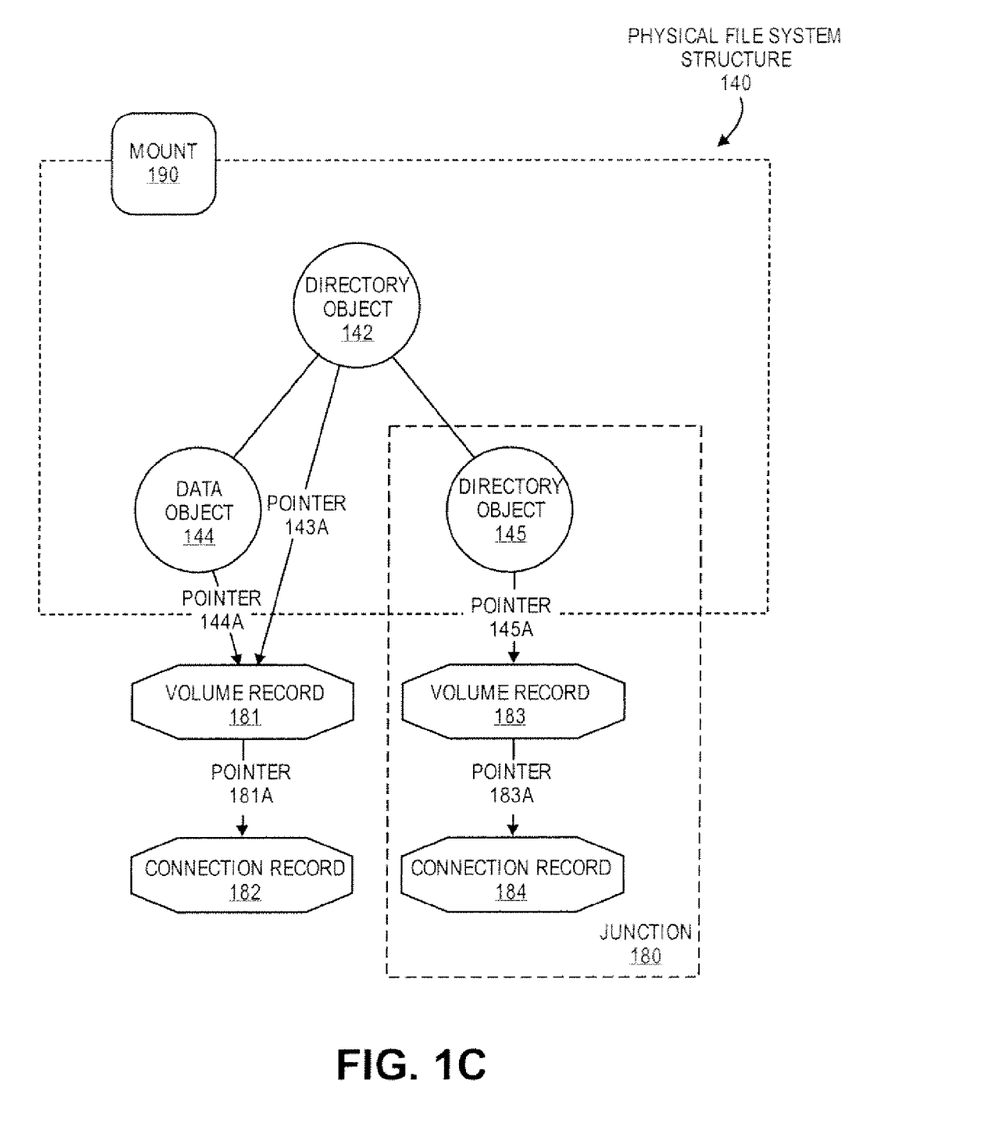
FIG. 1C is a block diagram illustrating elements in a file system structure, according to one embodiment.

FIG. 1C illustrates elements in a file system structure. Objects 142, 144, and 145 are elements of a physical file system structure 140. Each of objects 142, 144, and 145 contains a pointer to a volume record. For example, objects 142 and 144 contain pointers to volume record 181, while object 145 contains a pointer to volume record 183. In one embodiment, all of the objects contained in a logical volume point to the same volume record. In an alternative embodiment, a junction introduces a separate physical volume which is part of the logical volume. Thus, an object that is part of a junction includes a pointer to a different volume record. For example, directory object 145 includes a pointer 145a to volume record 183, which identifies a different physical volume than volume record 181.

Since a number of volumes may be supported on a storage server, in one embodiment, the junction volume resides on the same supporting storage server as other physical volumes contained within the logical volume. In an alternative embodiment, the junction volume resides on a separate storage server than other physical volumes contained within the logical volume. Such a junction volume uses a different network connection from the other physical volumes, and therefore includes a pointer to a different connection record. For example, the volume identified by volume record 183 and the volume identified by volume record 181 are on separate storage servers. Accordingly, volume records 183 and 181 point to different connection records 184 and 182, respectively. Objects 142 and 144 are part of the same physical volume and thus have pointers to the same volume record 181. Object 145 is a directory object and is part of a separate physical volume, represented by volume record 183.

Connection records 182 and 184 represent network connections to remote file systems, thus a separate connection record is associated with each volume record. The above method thus provides a seamless and transparent logical volume by abstracting physical volumes and connections.

Figure 2:
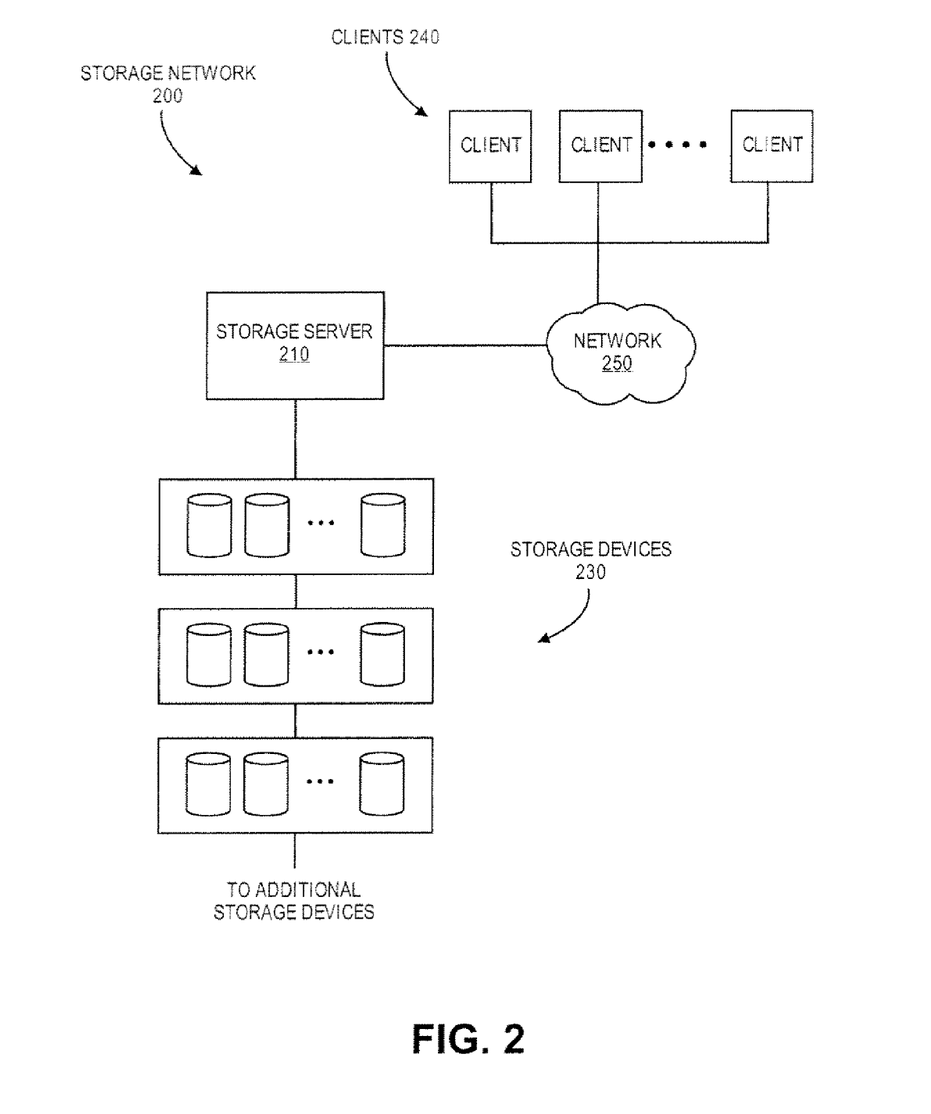
FIG. 2 illustrates one embodiment of a storage network.

FIG. 2 shows a storage network 200 in which the hybrid file system 100 may be used, according to one embodiment. The storage network 200 includes a storage server 210, a network 250, a number of storage devices 230 coupled to the storage server 210, and a number of client machines 240 coupled to the storage server 210 via the network 250. The network 250 may include a wide area network (WAN), a local area network (LAN), etc. The storage devices 230 may include a number of disks organized in shelves. The disks may include one or more Redundant Array of Independent Disks (RAID) volumes.

Note that any or all of the components of storage network 200 and associated hardware may be used in various embodiments. However, it can be appreciated that other configurations of the data storage system may include some or all of the devices disclosed above.

In one embodiment, the storage network 200 includes a storage area network (SAN) to transmit read/write requests at the block level of the storage server 210. A block is the basic unit used to store data in the SAN. In an alternative embodiment, the storage network 200 is a network-attached storage (NAS) system that transmits data at the file level. In the NAS system, complete files are retrieved instead of segments on a disk. The NAS system uses file access protocols to retrieve data, such as, for example, Network File System (NFS), or Common Internet File System (CIFS). The SAN and the NAS systems may be implemented in a single server or in separate servers. In one embodiment, hybrid file system 100 is implemented in storage server 210 and is used to facilitate access to physical storage volumes residing on storage devices 230.

Figure 3:
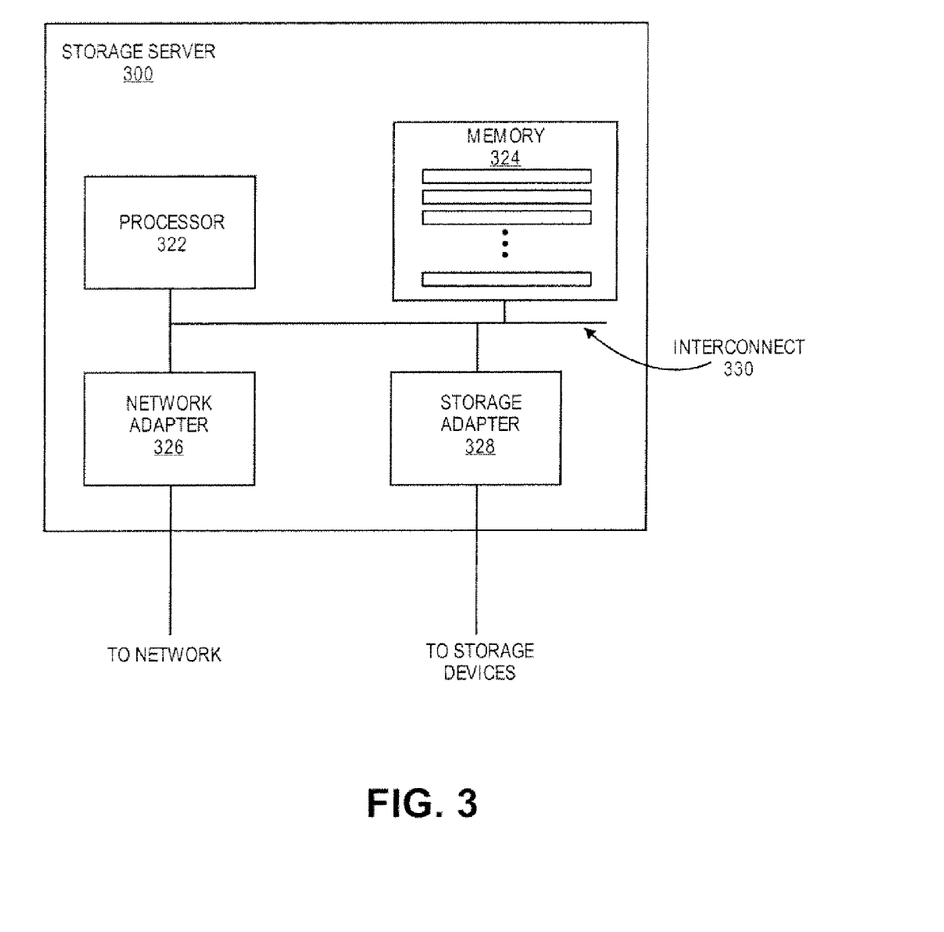
FIG. 3 illustrates one embodiment of a storage server.

FIG. 3 illustrates one embodiment of a storage server in a data storage system, such as storage server 210 in FIG. 2. The storage server 300 includes a processor 322, a memory 324, a network adapter 326, and a storage adapter 328, which are coupled to each other via an interconnect 330. In one embodiment, the storage server 300 is within a network and the network adapter 326 interfaces with the network. The network may include a local area network (LAN), or a wide area network (WAN), etc. Data is transmitted between the storage server 300 and the network via the network adapter 326. When data is received, the network adapter 326 may forward the data to the storage adapter 328, the memory 324, or the processor 322.

In one embodiment, the processor 322 reads instructions from the memory 324 and executes the instructions. The memory 324 may include any of various types of memory devices, such as, for example, random access memory (RAM), read-only memory (ROM), flash memory, one or more mass storage devices (e.g., disks), etc. In one embodiment, the memory 324 stores instructions of various software running on the storage server 300, such as a Redundant Array of Inexpensive Disks (RAID) engine, an operating system, storage subsystems (e.g., driver of disk drives, driver of tape drives, etc.), Network File System (NFS) applications, Network Internet Protocol (IP) Driver, etc. The processor 322 responds to requests from client machines, the network management station, or other storage servers and organizes data on the storage devices (e.g., disks) coupled to the storage server 300. The storage server 300 interfaces with the storage devices via the storage adapter 328.

Although illustrated as a self-contained element, the storage server 300 may have a distributed architecture; for example, it may include a separate N-("network") blade and D-(disk) blade (not shown). In such an embodiment, the N-blade is used to communicate with clients, such as clients 240, while the D-blade includes the file system functionality and is used to communicate with the storage subsystem, such as a storage subsystem including storage devices 230. The N-blade and D-blade communicate with each other using an internal protocol. Alternatively, the storage server 300 may have an integrated architecture, where the network and data components are all contained in a single box. The storage server 300 further may be coupled through a switching fabric to other similar storage servers (not shown) which have their own local storage subsystems. In this way, all of the storage subsystems can form a single storage pool, to which any client of any of the storage servers has access.

According to one embodiment, the data structures described above, such as the synthetic and physical file system objects, are implemented within memory 324 of storage server 300. Creation and manipulation of the data structures is performed by processor 322. Processor 322 also performs operations related to traversing the hierarchical structure of the hybrid file system 100.

Figure 4:
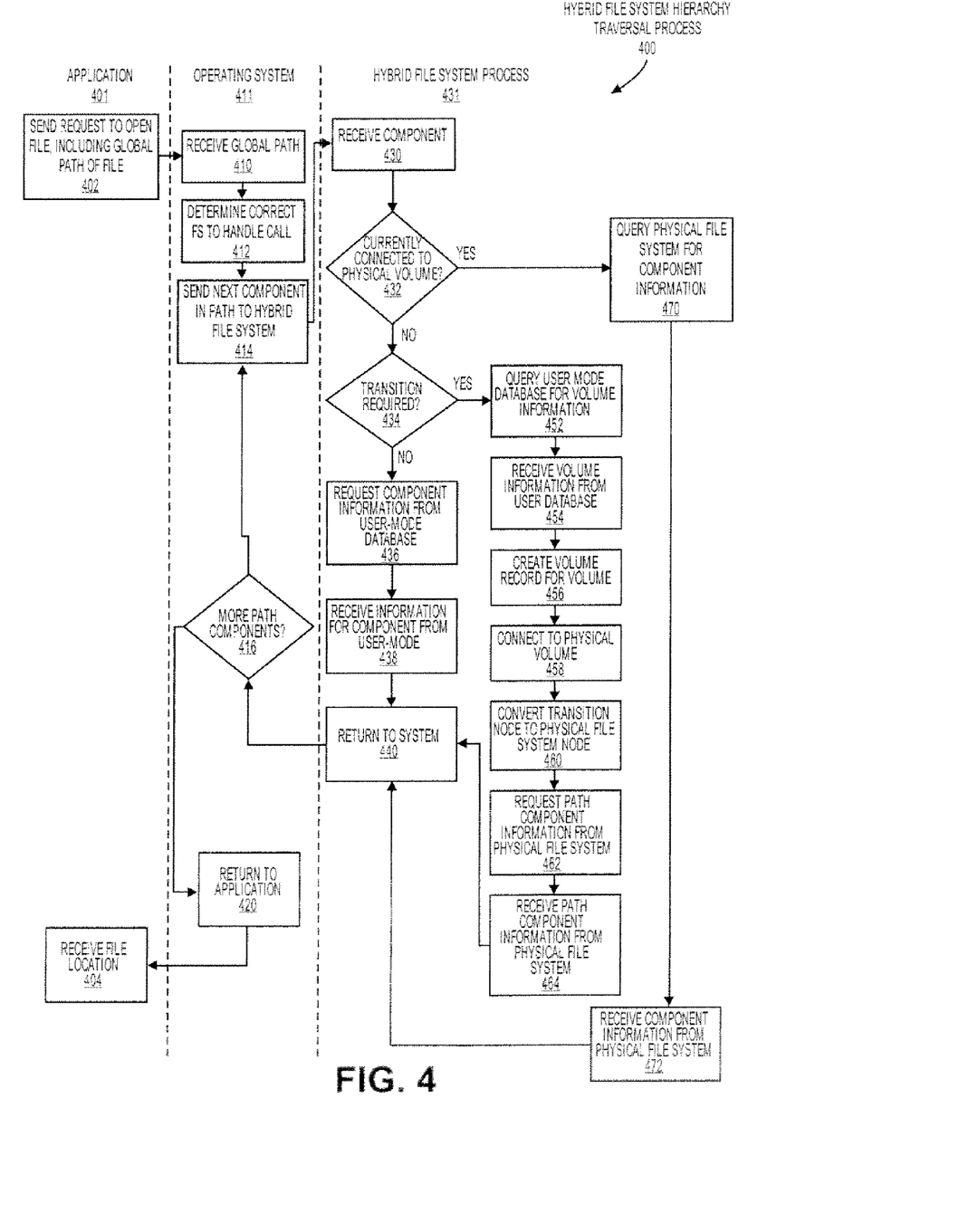
FIG. 4 is a flow chart illustrating a process for traversing a hybrid file system, according to one embodiment.

FIG. 4 illustrates a process 400 for traversing the hierarchical structure of the hybrid file system 100. Instructions for executing the traversal process 400 are contained in memory 324 and are executable by processor 322. Traversal process 400 is performed by components including an application 401, an operating system 411, and hybrid file system process 431.

The application 401 is a process that executes in user-mode and can be any process that requests access to data on a physical storage volume. For example, the application 401 may be anti-virus software that scans files on physical storage volumes in search of viruses. The application 401 may also be a system utility, such as a disk defragmenter.

Operating system 411 handles system calls from applications. In one embodiment, operating system 411 includes a VFS layer, such as VFS layer 171 in FIG. 1B, which is a kernel-mode abstraction layer that provides a unified file system for other processes executing in the system. In one embodiment, the VFS layer serves as an interface between system processes and a number of file systems, including hybrid file system 100. When the VFS layer receives a request for a file from a system process, the VFS layer determines which of the file systems to traverse in search of the requested file.

The hybrid file system process 431 is a process running in kernel-mode that fulfills requests from the operating system 411. Hybrid file system process 431 has access to the synthetic file system structure 120 and the physical file system structure 140.

At block 402 of the traversal process 400, the application 401 sends a request to open a file and includes the global path of the file in the request. The global path of the file identifies the location of the file in the unified file system provided by the VFS layer. With reference to FIG. 1A, for example, the global path to data object 144 may include a list of file system objects identifying the traversal path to data object 144, such as: "/root101/vserver123/directory142/data144". Here, file system objects "root101", "vserver123" and "directory142", represent directories and "data144" represents the requested file. Application 401 sends the request, including the global path, to the operating system 411, which receives the request at block 410.

Upon receiving the request, operating system 411 determines the correct file system for handling the request. For example, operating system 411 may interface with a number of file systems, including the hybrid file system 100. At block 412, if the request is directed to a file in the hybrid file system 100, execution proceeds to block 414.

At block 414, the operating system 411 identifies the next component in the global path and sends this component to the hybrid file system process 431. The next component is the highest component in the hierarchy (closest to the root) that has not yet been processed. In the above example, the system would select "root101" as the next component and send it to hybrid file system process 431. Hybrid file system process 431 receives the component at block 430.

At decision block 432, hybrid file system process 431 determines whether a connection has been made to a physical volume. If a connection has already been made to a physical volume, the physical volume is queried for information about the next component in block 470. If a connection to a physical volume has not been made, execution proceeds to block 434.

At block 434, hybrid file system process 434 determines whether traversal to the component received in block 430 requires that the hybrid file system process 431 switch from the synthetic file system structure 120 to the physical file system structure 140. If a transition is not required, hybrid file system process 431 requests information about the component from a first user-mode server database 121 at block 436. In one embodiment, hybrid file system process 431 sends this request via a remote procedure call (RPC) request to the user-mode server database 121. User-mode server database 121 is a user-mode data file structure that contains information about components, such as vservers objects, in the synthetic file system structure 120. The process of requesting component information according to block 436 is described in further detail below with reference to FIG. 5A.

At block 416, operating system 411 continues the traversal process 400 by determining whether the global path has more unprocessed path components. If the global path does not contain any more unprocessed path components, execution proceeds to block 420, where control is passed back to the application 401. If the global path contains unprocessed components, execution proceeds to block 414.

At block 414, the next component in the global path is processed. For example, in the global path "/root101/vserver123/directory142/data144", "vserver123" is the next component after "root101" has been processed by a previous execution of hybrid file system process 431.

Hybrid file system process 431 is capable of transitioning from the synthetic file system structure 120 to the physical file system structure 140. At block 434, the hybrid file system process 431 determines whether such a transition takes place.

For example, if the global path is "/root101/vserver123/directory142/data144", "directory142" corresponding to directory object 142 may be received by hybrid file system process 431 at block 430. Directory object 142 resides in the physical file system structure 140, while the previous component in the path, "vserver123" corresponding to vserver object 123, resides in the synthetic file system structure 120. Thus, traversal to directory object 142 requires a transition from synthetic file system structure 120 to physical file system structure 140. Thus directory object 142 will contain extra metadata information to effect this transition and is thus called a transition node.

If the hybrid file system process determines at block 434 that a transition is required, execution proceeds to block 452. At block 452, hybrid file system process 431 queries user-mode volume database 122 via RPC for volume information about the transition node.

The information requested from user-mode volume database 122 identifies a volume in the physical file system structure on which the contents of the transition node are stored. The requested information also identifies a network connection through which the physical volume can be accessed. The process of requesting volume information about the transition node according to block 452 is described in further detail below with reference to FIG. 5B.

At block 456, the hybrid file system process 431 creates a volume record in working memory to store information about the physical volume associated with the transition node.

At block 458, the hybrid file system process 431 uses the connection information received at block 454 to connect to the physical storage volume through a network connection.

At block 460, the transition node is converted from a synthetic file system node to a physical file system node. For example, if the transition node is vserver object 123, vserver object 123 becomes part of physical file system structure 140.

At block 462, the hybrid file system process 431 requests information about the path component received at block 430 from the physical file system 140. The physical file system 140 responds with information about the path component, which is received by the hybrid file system process 431 at block 464. Execution proceeds from block 464 to block 440, where control is returned to the operating system 411.

Once the volume record has been created at block 456 and a connection has been established to the physical storage volume at block 458, subsequent requests for path component information received at block 430 are directed to the physical file system.

At block 432, the hybrid file system process 431 determines whether the connection to the physical storage volume has already been made. If the connection to the physical storage volume exists, execution proceeds to block 470.

At block 470, the hybrid file system process 431 queries the physical file system for information about the component received at block 430. The process 431 receives the requested information at block 472.

For example, while processing the global path "/root101/vserver123/directory142/data144", the hybrid file system process 431 may receive the path component "data144" at block 430. If the connection to the physical storage volume has already been established, the hybrid file system process 431 will query the physical file system for information about "data144". In response, physical file system returns information about data object 144, which corresponds to "data144". This information includes metadata identifying the location of the requested data so that the data can be accessed by application 401.

At block 440, control is returned to operating system 411. Execution proceeds to block 416, where operating system 411 determines whether the global path contains any unprocessed components. If no more path components remain to be processed, execution proceeds to block 420, where the operating system 411 returns to the application 401. For example, since "data144" is the last path component, no more path components remain to be processed at block 416 and system will proceed to block 420. At block 420, operating system 411 also returns the information for locating the requested file to application 401. The application receives the information it needs for accessing the requested file at block 404.

Thus, at block 404, application 401 receives the information about the file that was requested at block 402. For example, if application 401 at block 402 requests to open a file according to global path "/root101/vserver123/directory142/data144", application 401 at block 404 receives information that allows application 401 to access the file "data144" on the physical storage volume where the file "data144" resides.

Figure 5A:
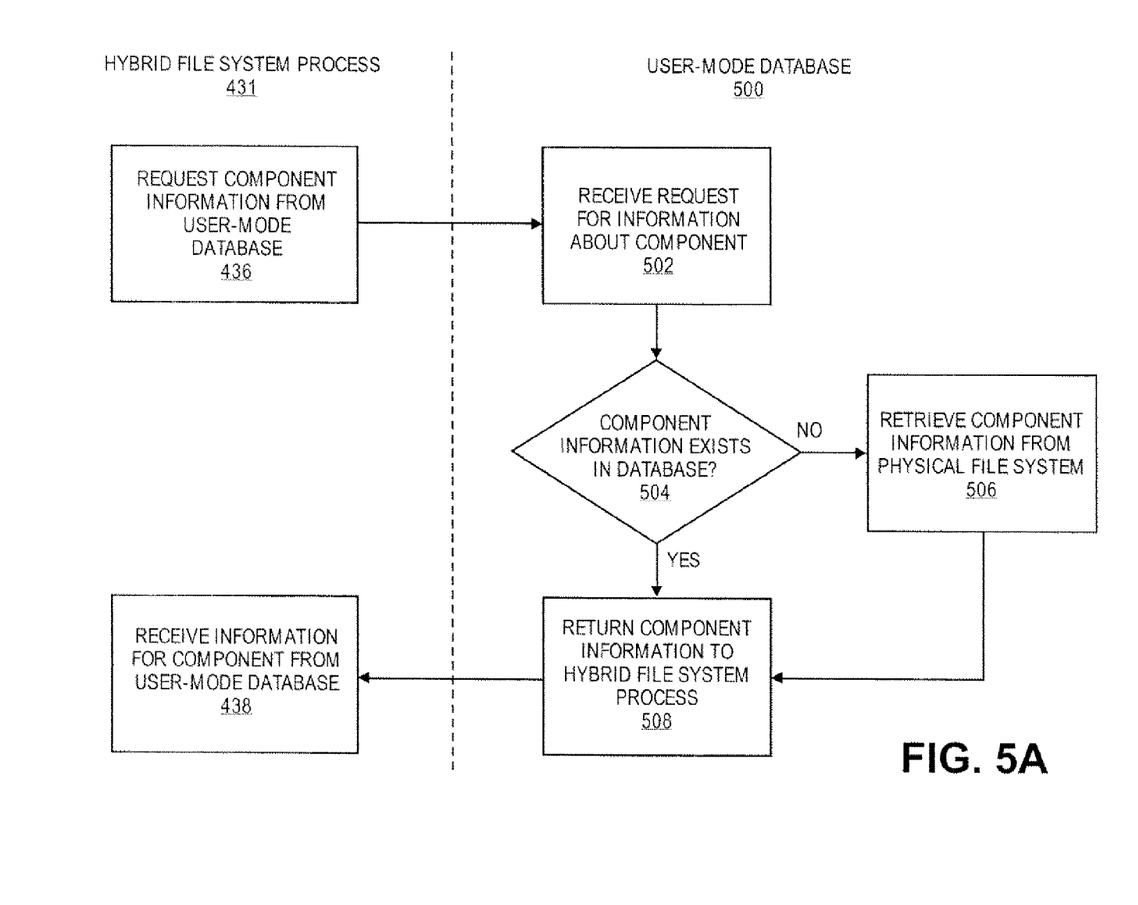
FIG. 5A is a flow chart illustrating a process for requesting component information from a user-mode database, according to one embodiment.

FIG. 5A illustrates a process for retrieving component information from user-mode server database 121, according to one embodiment. The process illustrated in FIG. 5A is executed in response to block 436 of FIG. 4. This process is executed by hybrid file system process 431 and user-mode database application 500, which is a process that performs operations on the user-mode server database 121. At block 436, hybrid file system process 431 requests the component information from user-mode server database 121 via RPC. At block 502, user-mode database application 500 receives the RPC request. At block 504, the user-mode database application 500 determines whether the user-mode server database 121 contains the requested component information. If user-mode server database 121 contains the requested component information, then execution proceeds to block 508. Otherwise, if user-mode server database 121 does not contain the requested component information, user-mode database application 500 retrieves the component information from physical file system structure 140 at block 506 and proceeds to block 508.

At block 508, user-mode server database 121 returns the component information to the hybrid file system process 431. Upon receiving information about the component from user-mode server database 121 at block 438, hybrid file system process 431 creates a node in working memory to store the component information. At block 440 of FIG. 4, the hybrid file system process 431 returns control to the operating system 411.

Figure 5B:
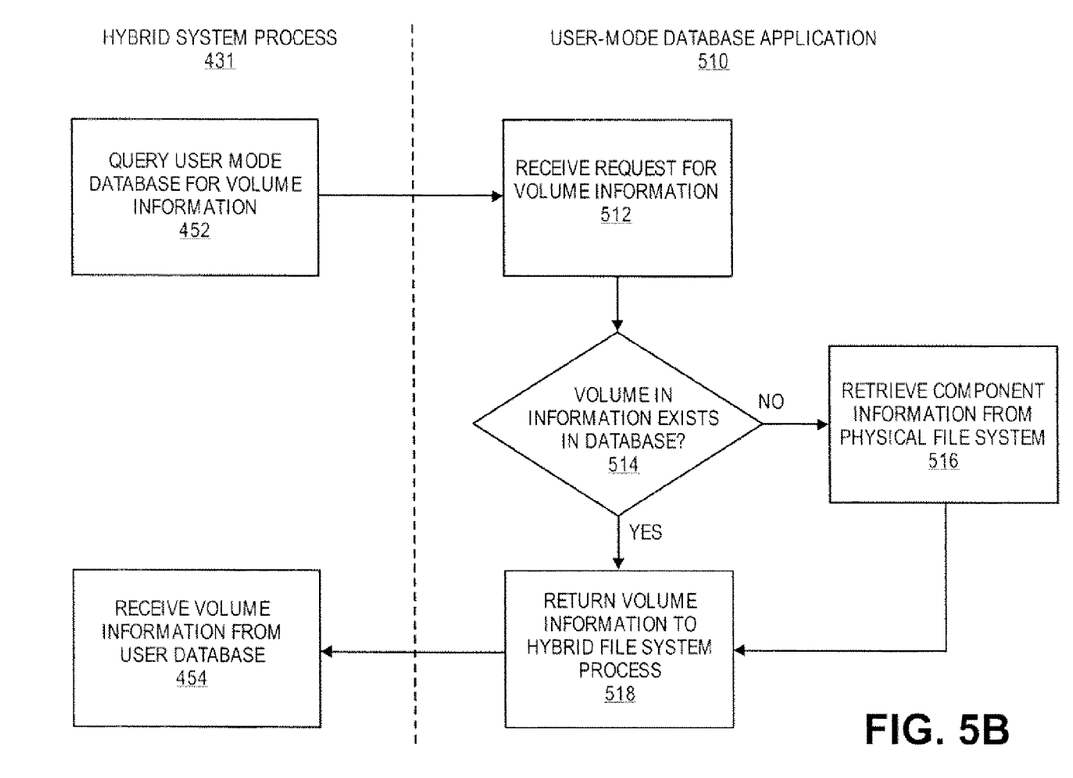
FIG. 5B is a flow chart illustrating a process for requesting volume information from a user-mode database, according to one embodiment.

FIG. 5B illustrates a process for retrieving volume information from user-mode volume database 122, according to one embodiment. The process illustrated in FIG. 5A is executed in response to block 436 of FIG. 4. This process is executed by hybrid file system process 431 and user-mode database application 510, which is a process that performs operations on the user-mode volume database 122. At block 452, hybrid file system process 431 requests the volume information from user-mode volume database 122 via RPC. At block 512, user-mode database application 510 receives the RPC request. At block 514, the user-mode database application 510 determines whether the user-mode volume database 122 contains the requested volume information. If user-mode volume database 122 contains the requested volume information, execution proceeds to block 518. Otherwise, if user-mode volume database 122 does not contain the requested component information, user-mode database application 510 retrieves the component information from physical file system structure 140 at block 516 and proceeds to block 518.

At block 518, the user-mode database application 510 returns the requested volume and connection information to the hybrid file system process 431, which receives the information at block 454.

Embodiments of the present invention provide access to physical storage volumes by presenting a unified file system structure to an operating system. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention.

It will be appreciated that certain embodiments of the present invention may be implemented with solid-state memories including flash storage devices constituting storage devices 230. For example, hybrid file system 100 may be operative with non-volatile, solid-state NAND flash devices which are block-oriented devices having good (random) read performance, i.e., read operations to flash devices are substantially faster than write operations. Data stored on a flash device are accessed (e.g., via read and write operations) in units of pages, which in the present embodiment are 4 kB in size, although other page sizes (e.g., 2 kB) may also be used.

When the flash storage devices are organized as one or more parity groups in a RAID array, the data is stored as stripes of blocks within the parity groups, wherein a stripe may constitute similarly located flash pages across the flash devices. For example, a stripe may span a first page 0 on flash device 0, a second page 0 on flash device 1, etc. across the entire parity group with parity being distributed among the pages of the devices. Note that other RAID group arrangements are possible, such as providing a RAID scheme wherein every predetermined (e.g., 8th) block in a file is a parity block.

Moreover, the description of FIGS. 2 and 3 is intended to provide an overview of computer hardware and other operating components suitable for performing the methods of the invention described above, but is not intended to limit the applicable environments. One of skill in the art will immediately appreciate that the invention can be practiced with other computer system configurations. The invention can also be practiced in distributed computing environments where tasks are performed by remote processing devices that are linked through a communications network.

It will be readily apparent to one of skill, that input/output devices, such as a keyboard, a pointing device, and a display, may be coupled to the storage server. These conventional features have not been illustrated for sake of clarity.

The present invention also relates to an apparatus for performing the operations described herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The computer-executable instructions may be written in a computer programming language or may be embodied in firmware logic or in hardware circuitry. If written in a programming language conforming to a recognized standard, such instructions can be executed on a variety of hardware platforms and for interface to a variety of operating systems (e.g., Write Anywhere File Layout (WAFL) system provided by Network Appliance, Inc. of Sunnyvale, Calif.). In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, process, application, module, logic . . . ), as taking an action or causing a result. Such expressions are merely a shorthand way of saying that execution of the software by a computer causes the processor of the computer to perform an action or produce a result. It will be further appreciated that more or fewer processes may be incorporated into the method illustrated in FIGS. 4, 6, and 8 without departing from the scope of the invention and that no particular order is implied by the arrangement of blocks shown and described herein.

Some portions of the preceding detailed description are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the preceding discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Therefore, it is manifestly intended that this invention be limited only by the following claims and equivalents thereof.

What is claimed is:

1. A method of execution by a processor, comprising:
receiving, by the processor, a request to access a file stored in a remote one of physical storage volumes, the request specifying a location of the file by a global path that comprises a first sequence of components followed by a second sequence of components with a last component in the second sequence being a filename of the file, wherein the first sequence of components are from a synthetic file system structure of a unified file system, and a second sequence of components are from a physical file system structure of the unified file system, and wherein the synthetic file system structure is defined by first metadata stored in at least one user-mode database and the physical file system structure contains second metadata that describes data stored on the physical storage volumes, wherein the physical storage volumes are located on multiple storage servers and are accessible via network connections through a single mounted physical storage volume that is different from the remote physical storage volume;
requesting, for each of the components in the first sequence, information about the component from the at least one user-mode database, wherein a last component in the first sequence is a transition node, which is a component containing information linking the synthetic file system structure and the physical file system structure;
receiving volume and network connection information of the transition node from the at least one user-mode database;
connecting to the remote physical storage volume via a network connection that is identified using the volume and network connection information;
requesting information about the transition node from the physical file system structure; and
requesting, for each of the components in the second sequence, information about the component from the physical file system structure through the single mounted physical storage volume to determine the location of the file in the remote physical storage volume.

2. The method of claim 1, wherein the transition node includes a reference to a second object in the physical file system structure, the method further comprising:
locating the second object using the reference to the second object.

3. The method of claim 1, wherein requesting, for each of the components in the second sequence, information about the component from the physical file system structure further comprises:
locating in the physical file system structure an object corresponding to the file, wherein the object corresponding to the file includes a reference to a volume record; and
identifying the remote physical storage volume based on metadata in the volume record.

4. The method of claim 3, further comprising:
identifying a connection used for accessing the remote physical storage volume, wherein the volume record designates the connection;
connecting to the remote physical storage volume through the connection; and
retrieving the file from the remote physical storage volume.

5. The method of claim 4, wherein the volume record designates the connection by including a reference to a connection record identifying the connection.

6. The method of claim 1, wherein the physical file system structure comprises a plurality of volume records, each of the plurality of volume records identifying a different physical storage volume.

7. The method of claim 1, wherein a plurality of objects in the physical file system structure are accessible through a single mount point.

8. The method of claim 1, wherein requesting, for each of the components in the first sequence, information about the component from the at least one user-mode database further comprises:
querying a user-mode server database to retrieve metadata defining objects in a first hierarchical level of the synthetic file system structure; and
querying a user-mode volume database to retrieve metadata defining objects in a second hierarchical level of the synthetic file system structure.

9. The method of claim 1, wherein the transition node is included in both the synthetic file system structure and the physical file system structure.

10. A system, comprising:
a plurality of physical storage volumes located on multiple storage servers and accessible via network connections through a single mounted physical storage volume, wherein the system supports a unified file system that comprises a synthetic file system structure and a physical file system structure, and wherein the synthetic file system structure is defined by first metadata stored in at least one user-mode database, and the physical file system structure contains second metadata that describes data stored on physical storage volumes;
a processor; and
a memory coupled with the processor, wherein the memory contains instructions executable by the processor to cause the processor to perform operations comprising:
receiving a request to access a file in a remote one of the physical storage volumes, wherein the remote physical storage volume is different from the single mounted physical storage volume, and wherein the request specifies a location of the file by a global path that comprises a first sequence of components followed by a second sequence of components with a last component in the second sequence being a filename of the file;
requesting, for each of the components in the first sequence, information about the component from the at least one user-mode database, wherein a last component in the first sequence is a transition node, which is a component containing information linking the synthetic file system structure and the physical file system structure;
receiving volume and network connection information of the transition node from the at least one user-mode database;
connecting to the remote physical storage volume via a network connection that is identified using the volume and network connection information;
requesting information about the transition node from the physical file system structure; and
requesting, for each of the components in the second sequence, information about the component from the physical file system structure through the single mounted physical storage volume to determine the location of the file in the remote physical storage volume.

11. The system of claim 10, wherein the transition node stores a reference to a second object in the physical file system structure, and wherein the reference is used to locate the second object.

12. The system of claim 10, wherein the memory further contains instructions executable by the processor to cause the processor to determine the location of the file in the remote physical storage volume by:
locating in the physical file system structure an object corresponding to the file, wherein the object corresponding to the file includes a reference to a volume record; and
identifying the remote physical storage volume based on metadata in the volume record.

13. The system of claim 12, wherein the memory further contains instructions executable by the processor to cause the processor to:
identify a connection used for servicing the remote physical storage volume, wherein the volume record designates the connection;
connect to the remote physical storage volume through the connection; and
retrieve the file from the remote physical storage volume.

14. The system of claim 12, wherein the volume record stores a reference to a connection record identifying the connection.

15. The system of claim 10, wherein the physical file system structure comprises a plurality of volume records, each of the plurality of volume records identifying a different physical storage volume.

16. The system of claim 10, further comprising a mount point providing access to objects in the physical file system structure.

17. The system of claim 10, wherein the at least one user-mode database comprises:
a user-mode server database to store metadata defining objects in a first hierarchical level of the synthetic file system structure; and
a user-mode volume database to store metadata defining objects in a second hierarchical level of the synthetic file system structure.

18. The system of claim 10, wherein the transition node is included in both the synthetic file system structure and the physical file system structure.

19. A storage server, comprising:
a network adapter to connect to a network;
a storage adaptor to connect to a plurality of physical storage volumes located on multiple storage servers and accessible via network connections through a single mounted physical storage volume, wherein the storage server supports a unified file system that comprises a synthetic file system structure and a physical file system structure, and wherein the synthetic file system structure is defined by first metadata stored in at least one user-mode database, and the physical file system structure contains second metadata that describes data stored on physical storage volumes;
a processor coupled with the network adapter and the storage adapter; and a memory coupled with the processor, wherein the memory contains instructions executable by the processor to cause the processor to perform operations comprising:

receiving a request to access a file in a remote one of the physical storage volumes, wherein remote physical storage volume is different from the single mounted physical storage volume, and wherein the request specifies a location of the file by a global path that comprises a first sequence of components followed by a second sequence of components with a last component in the second sequence being a filename of the file;

requesting, for each of the components in the first sequence, information about the component from the at least one user-mode database, wherein a last component in the first sequence is a transition node, which is a component containing information linking the synthetic file system structure and the physical file system structure;

receiving volume and network connection information of the transition node from the at least one user-mode database;

connecting to the remote physical storage volume via a network connection that is identified using the volume and network connection information;

requesting information about the transition node from the physical file system structure; and requesting, for each of the components in the second sequence, information about the component from the physical file system structure through the single mounted physical storage volume to determine the location of the file in the remote physical storage volume.

20. The storage server of claim 19, wherein the transition node stores a reference to a second object in the physical file system structure, and wherein the reference is used to locate the second object.

21. The storage server of claim 19, wherein the memory further contains instructions executable by the processor to cause the processor to determine the location of the file in the remote physical storage volume by:

locating in the physical file system structure an object corresponding to the file, wherein the object corresponding to the file includes a reference to a volume record; and identifying the remote physical storage volume based on metadata in the volume record.

22. The storage server of claim 21, wherein the memory further contains instructions executable by the processor to cause the processor to:

identify a connection used for servicing the remote physical storage volume, wherein the volume record designates the connection;

connect to the remote physical storage volume through the connection; and retrieve the file from the remote physical storage volume.

23. The storage server of claim 21, wherein the volume record stores a reference to a connection record identifying the connection.

24. The storage server of claim 19, wherein the physical file system structure comprises a plurality of volume records, each of the plurality of volume records identifying a different physical storage volume.

25. The storage server of claim 19, further comprising a mount point providing access to objects in the physical file system structure.

\* \* \* \* \*